United States Patent
Cheverton et al.

(10) Patent No.: US 9,395,301 B2
(45) Date of Patent: Jul. 19, 2016

(54) METHODS FOR MONITORING ENVIRONMENTAL BARRIER COATINGS

(71) Applicant: General Electric Company, Schenectady, NY (US)

(72) Inventors: Mark Allen Cheverton, Mechanicville, NY (US); Anant Achyut Setlur, Niskayuna, NY (US); Victor Petrovich Ostroverkhov, Ballston Lake, NY (US); Guanghua Wang, Clifton Park, NY (US); Joseph John Shiang, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 1 day.

(21) Appl. No.: 14/504,917

(22) Filed: Oct. 2, 2014

(65) Prior Publication Data
US 2016/0097719 A1    Apr. 7, 2016

(51) Int. Cl.
*G01N 21/64* (2006.01)
*G01J 5/10* (2006.01)
*G01J 5/08* (2006.01)

(52) U.S. Cl.
CPC ............ *G01N 21/64* (2013.01); *G01J 5/0896* (2013.01); *G01J 5/10* (2013.01); *G01N 2201/062* (2013.01); *G01N 2201/06113* (2013.01)

(58) Field of Classification Search
CPC ........... G01N 21/64; G01J 5/0896; G01J 5/10
See application file for complete search history.

(56) References Cited

U.S. PATENT DOCUMENTS

| 4,560,286 | A  | * | 12/1985 | Wickersheim | G01J 5/48 250/461.1 |
| --- | --- | --- | --- | --- | --- |
| 4,774,150 | A  |   | 9/1988  | Amano et al. | |
| 5,730,528 | A  | * | 3/1998  | Allison | G01K 11/20 250/459.1 |
| 6,072,568 | A  | * | 6/2000  | Paton | G01L 1/24 356/32 |
| 6,123,997 | A  |   | 9/2000  | Schaeffer et al. | |
| 6,730,918 | B2 | * | 5/2004  | Srivastava | G01N 21/8422 250/458.1 |
| 6,943,357 | B2 |   | 9/2005  | Srivastava et al. | |
| 6,974,641 | B1 | * | 12/2005 | Choy | C23C 30/00 250/361 R |
| 7,063,894 | B2 | * | 6/2006  | Sun | C04B 41/009 416/241 B |

(Continued)

FOREIGN PATENT DOCUMENTS

| CN | 101858872 B | 9/2011 |
| --- | --- | --- |
| CN | 103558144 A | 2/2014 |

(Continued)

OTHER PUBLICATIONS

Tobin, Kenneth et al, Fiber Sensor Design for Turbine Engines, Industrial Application of Fiber Optic Sensors, Dec. 1, 1991, pp. 23-31, vol. 1584.

(Continued)

*Primary Examiner* — Christine Sung
(74) *Attorney, Agent, or Firm* — Paul J. DiConza

(57) ABSTRACT

A method of monitoring a surface temperature of an environmental barrier coating (EBC) of a hot gas component includes directing an excitation beam having a first wavelength at a layer of a temperature indicator formed on the hot gas component. The method also includes measuring a fluorescent radiation emitted by the temperature indicator. The fluorescent radiation has a second wavelength and an intensity. In addition, the method includes determining a surface temperature of the EBC based on the intensity of the second wavelength of the fluorescent radiation.

9 Claims, 6 Drawing Sheets

(56) References Cited

U.S. PATENT DOCUMENTS

| | | | |
|---|---|---|---|
| 7,507,022 B2* | 3/2009 | Bird | G01K 11/20 356/43 |
| 7,858,952 B2 | 12/2010 | Feist et al. | |
| 7,901,203 B2 | 3/2011 | Ni et al. | |
| 8,004,423 B2 | 8/2011 | Mitchell et al. | |
| 8,132,467 B2 | 3/2012 | Shinde et al. | |
| 8,173,266 B2 | 5/2012 | Choy et al. | |
| 8,221,825 B2 | 7/2012 | Reitz et al. | |
| 8,313,794 B2 | 11/2012 | Vance | |
| 8,558,194 B2* | 10/2013 | Wolfe | G01N 21/8422 250/461.1 |
| 2002/0006153 A1 | 1/2002 | Ranson et al. | |
| 2004/0232826 A1* | 11/2004 | Liu | C09K 11/08 313/503 |
| 2006/0177676 A1 | 8/2006 | Bast et al. | |
| 2009/0122832 A1 | 5/2009 | Feist et al. | |
| 2009/0162533 A1* | 6/2009 | Kirby | C23C 30/00 427/8 |
| 2009/0202864 A1 | 8/2009 | Feist et al. | |
| 2010/0035043 A1 | 2/2010 | Bird | |
| 2011/0069735 A1* | 3/2011 | Feist | C09D 5/26 374/102 |
| 2011/0236657 A1 | 9/2011 | Feist et al. | |
| 2011/0275932 A1* | 11/2011 | Leblond | A61B 5/0062 600/425 |
| 2013/0062323 A1* | 3/2013 | Hassan | G01N 21/718 219/121.62 |
| 2013/0177439 A1* | 7/2013 | Zhang | F01D 5/288 416/241 R |
| 2014/0030464 A1 | 1/2014 | Das et al. | |

FOREIGN PATENT DOCUMENTS

| | | |
|---|---|---|
| DE | 69905907 T2 | 12/2003 |
| EP | 1688723 B1 | 10/2007 |
| GB | 2439389 A | 12/2007 |
| JP | 3281857 B2 | 5/2002 |
| JP | 2004093300 A | 3/2004 |
| JP | 2005146291 A | 6/2005 |
| JP | 2007297947 A | 11/2007 |
| JP | 2009149492 A | 7/2009 |
| JP | 4753568 B2 | 8/2011 |
| WO | 2012027442 A1 | 3/2012 |

OTHER PUBLICATIONS

Alaruri, Sami D. et al, High-Temperature Remote Thermometry Using Later-Induced Fjluorescence Decay Lifetime Measurements of Y2O3:Eu and YAG:Tb Thermographic Phosphors, Instrumentation and Measurement, IEEE Transactions, Jun. 1993, pp. 735-739, vol. 42, Issue 3.

M.D. Chambers et al, Terbium as an alternative for Luminescence Sensing of Temperature of Thermal Barrier Coating Materials, Surface Coatings Technology, ScienceDirect, Dec. 15, 2007, pp. 688-692, vol. 202, Issues 4-7.

Fuhrmann, N. et al, High-Speed Phosphor Thermometry, Review of Scientific Instruments, IEEE, Oct. 2011, pp. 104903-104903-4, vol. 82, Issue 10.

M.D. Chambers et al, Luminescence Thermometry for Environmental Barrier Coating Materials, Surface and Coatings Technology, ScienceDirect, Dec. 25, 2008, pp. 461-465, vol. 203, Issues 5-7.

* cited by examiner

METHODS FOR MONITORING ENVIRONMENTAL BARRIER COATINGS

BACKGROUND

The subject matter described herein relates generally to methods for monitoring environmental barrier coating (EBC) conditions, and more specifically, to methods for monitoring temperature and erosion of EBCs using phosphor thermometry.

Higher operating temperatures for gas turbine engines are continuously sought in order to increase their efficiency. However, as operating temperatures increase, the high temperature durability of the components of the engine must correspondingly increase. In known gas turbine engines, ceramic materials containing silicon, such as those comprising silicon carbide as a matrix material and/or as a reinforcing material are used as substrate materials for higher temperature applications. These silicon-containing matrix/reinforcing materials are commonly referred to as ceramic matrix composites (CMCs). CMCs facilitate decreasing the weight yet maintaining the strength and durability of gas turbine engine components comprising such substrates, such as turbine components comprising airfoils (e.g., compressors, turbines, vanes, etc.), combustors, and other turbine components for which reduced weight is desirable.

As operating temperatures increase, the high temperature durability of CMC materials must also correspondingly increase. In many applications, a protective coating is beneficial or required for CMCs. Such coatings provide environmental protection by inhibiting the major mechanism for degradation of CMC materials in a corrosive water-containing environment, namely, the formation of volatile silicon monoxide and silicon hydroxide products. Consequently, a necessary requirement of an EBC system is stability in high temperature environments containing water vapors. In order to assess EBC systems in such environments, it is necessary to measure online or real-time component temperature and to monitor EBC health. However, measurement of the temperature of objects in a remote, non-contact, manner or on moving parts is very difficult.

BRIEF DESCRIPTION

In one aspect, a method of monitoring a surface temperature of an environmental barrier coating (EBC) of a hot gas component is provided. The method includes directing an excitation beam having a first wavelength at a layer of a temperature indicator formed on the hot gas component. The method also includes measuring a fluorescent radiation emitted by the temperature indicator. The fluorescent radiation has a second wavelength and an intensity. In addition, the method includes determining a surface temperature of the EBC based on the intensity of the second wavelength of the fluorescent radiation.

In another aspect, a method of monitoring at least one of a temperature and erosion of an environmental barrier coating (EBC) of a hot gas component is provided. The method includes directing an excitation beam having an excitation wavelength at the EBC deposited on an outer layer of the hot gas component. The EBC includes at least a bond coat layer and an outer layer. The hot gas component is fabricated from a ceramic matrix composite (CMC). In addition, the method includes measuring a first fluorescent radiation emitted by the bond coat layer and a second fluorescent radiation emitted by the outer layer of the EBC. The first fluorescent radiation includes a first wavelength and a first intensity and the second fluorescent radiation includes a second wavelength and a second intensity. The second wavelength is different from the first wavelength. The method also includes determining at least one of a surface temperature and an erosion amount of the EBC based on at least one of the wavelength and intensity of the measured first and second fluorescent radiations.

DRAWINGS

These and other features, aspects, and advantages of the present disclosure will become better understood when the following detailed description is read with reference to the accompanying drawings in which like characters represent like parts throughout the drawings, wherein.

Figure 1:
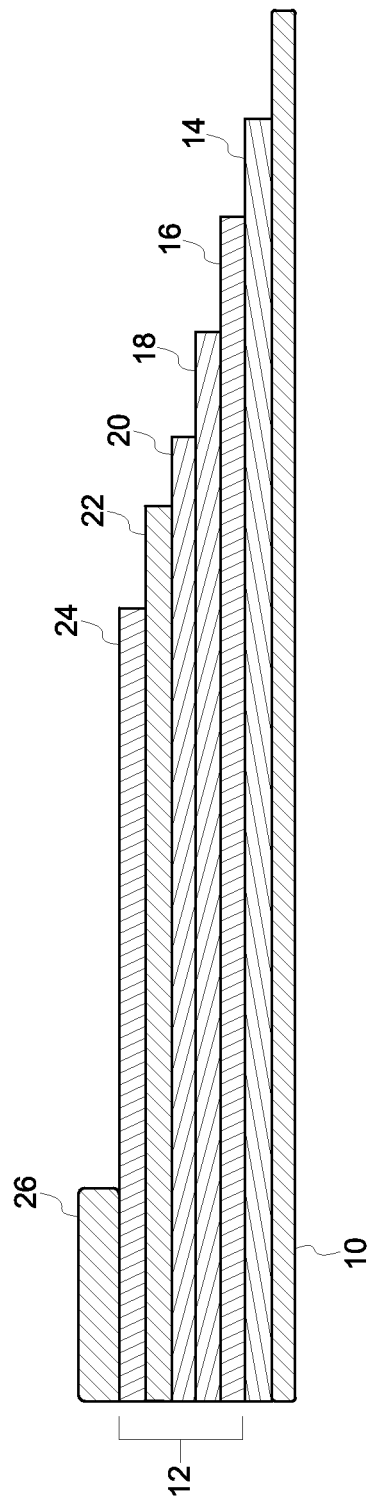
FIG. 1 is a schematic cross sectional view of an exemplary embodiment of a component having a temperature indicator forming an outer layer thereof.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The methods described herein facilitate measuring ceramic matrix composite (CMC) component environmental barrier coating (EBC) conditions using the existing composition of EBC material. Specifically, the methods described herein facilitate using a radiation source to cause an indicator material on or within the EBC to fluoresce, wherein the intensity of the fluorescent emission is based on a surface temperature of the EBC, and a specific wavelength of the fluorescent emission is based on a specific indicator material embedded in or formed on the EBC material. Specifically, one of the embodiments described herein facilitates monitoring the life of the EBC by including a different indicator material in each layer of the EBC, where each indicator material fluoresces in a different spectral range. Also, another one of the embodiments described herein facilitates monitoring the temperature of the EBC by including a specific indicator material in the outer material layer of the EBC, where the indicator material fluoresces at an intensity that corresponds to the temperature of the indicator material, which in turn corresponds to the temperature of the component or a region of the component. Furthermore, another one of the embodiments described herein facilitates monitoring the temperature of the EBC by including an indicator material in a separate material that is used to form an additional material layer on the EBC. As such, the embodiments described herein provide for accurate surface temperature measurements for the EBC, use of the existing EBC composition without adding other materials, facilitating online or real-time EBC health monitoring and prognosis, and facilitating EBC repair monitoring and quality control.

FIG. 1 is a schematic cross sectional view of an exemplary embodiment of a component 10 having a temperature indicator 26 forming an outer layer thereof. In the exemplary embodiment, component 10 is a hot gas component, i.e., a component for use in high temperature environments (e.g. operating temperatures of above 2500 degrees Fahrenheit (° F.) (~1371 degrees Celsius (° C.))), such as those present in gas turbine engines. Component 10 is fabricated from a high temperature CMC and includes, for example, without limitation, combustor components, turbine blades, nozzles, heat shields, and vanes. As used herein, CMC refers to silicon-containing matrix and reinforcing materials, for example, without limitation, materials having a matrix and reinforcing fibers comprising silicon carbide, silicon nitride, and mixtures thereof.

Component 10 includes an EBC 12 that includes a coating system having various material layer combinations. In the exemplary embodiment, EBC 12 includes a bond coat layer 14, a silica layer 16, a transition layer 18, a compliant layer 20, an intermediate layer 22, and an outer layer 24, where each material layer extends substantially over all of a previous material layer. Alternatively, EBC 12 includes any combination of material layers that enable EBC 12 to function as described herein and it is anticipated that some materials layers may be omitted. EBC 12 facilitates providing environmental protection to, and reducing the operating temperature of, component 10, thereby facilitating increasing the service life of component 10 in certain environments and at higher temperatures.

In the exemplary embodiment, bond coat layer 14 includes, for example, without limitation, silicon metal, silicide, or a combination thereof, and has a thickness in the range between about 0.1 mils to about 6 mils (about 25 micrometers to about 152 micrometers). In alternative embodiments, bond coat layer 14 is doped with a doping composition, as described further herein. The term "silicide", as used herein, includes rare earth silicides, for example, without limitation, chromium silicide, niobium silicide, and molybdenum silicide. The term "rare earth", as used herein, refers to the rare earth elements (REEs) of scandium, yttrium, lanthanum, cerium, praseodymium, neodymium, promethium, samarium, europium, gadolinium, terbium, dysprosium, holmium, erbium, thulium, ytterbium, lutetium, and mixtures thereof.

In the exemplary embodiment, silica layer 16 has an initial thickness in the range between about 0.0 mils and about 0.2 mils (about 0.0 micrometers to about 5 micrometers). It is noted, however, that the thickness of silica layer 16 can increase over time due to the oxidation of the silicon in bond coat layer 14. This oxidation of the silicon in bond coat layer 14 can gradually increase the thickness of silica layer 16. In alternative embodiments, silica layer 16 is doped with a doping composition, as described further herein.

Furthermore, in the exemplary embodiment, transition layer 18 includes, for example, without limitation, a rare earth disilicate, a doped rare earth disilicate, or a doped rare earth disilicate containing secondary materials. Transition layer 18 has a thickness in the range between about 0.1 mils and about 40 mils (about 2.5 micrometers to about 1 millimeter). In alternative embodiments, EBC 12 includes more than one transition layer 18. In such alternative embodiments, each transition layer 18 includes the same or different combinations of primary transition materials and secondary materials. Furthermore, in alternative embodiments, transition layer 18 is doped with a doping composition, as described further herein.

Moreover, in the exemplary embodiment, compliant layer 20 includes, for example, without limitation, a barium-strontium-aluminosilicate (BSAS) composition. Compliant layer 20 has a thickness in the range between about 0.1 mils and about 40 mils (about 2.5 micrometers to about 1 millimeter). In alternative embodiments, compliant layer 20 is doped with a doping composition, as described further herein.

Intermediate layer 22 includes, for example, without limitation, a rare earth monosilicate or a doped rare earth monosilicate. Similar to silica layer 16, intermediate layer 22 can form during the service life of EBC 12. In particular, in alternative embodiments of EBC 12 without compliant coating 20, high temperature steam penetrates outer layer 24 of EBC 12 and reacts with the material of transition layer 18 to volatilize silicon dioxide, thereby facilitating the formation of intermediate layer 22. In alternative embodiments, intermediate layer 22 is doped with a doping composition, as described further herein.

Similarly, outer layer 24 includes, for example, without limitation, a rare earth monosilicate, a doped rare earth monosilicate, or a doped rare earth monosilicate containing a secondary material. Outer layer 24 has a thickness in the range between about 0.1 mils to about 3 mils (about 2.5 micrometers to about 76 micrometers). In alternative embodiments, outer layer 24 is doped with a doping composition, as described further herein.

In the exemplary embodiment, a sensor patch, or temperature indicator 26 forms a layer that extends over substantially all of outer layer 24 of EBC 12. Temperature indicator 26 includes a rare earth monosilicate or a rare earth disilicate, doped with an REE. REEs have a special electron structure that enables them to have special properties of fluorescence when excited (provided with energy). For example, REEs can be used to covert long wavelength (IR) photons to shorter wavelength photons (up-conversion) and can absorb a short wavelength photon (UV) and re-emit one or more longer wavelength photons (down-conversion). The intensity of the fluorescent emissions from REEs correlates to a temperature of the specific REE, i.e., the intensity of the fluorescent emissions can be calibrated as a function of temperature.

In the exemplary embodiment, temperature indicator 26 is a combination of yttrium silicate and terbium. Temperature indicator 26 forms a layer having a thickness in the range between about 0.2 mils and about 8 mils (about 5 micrometers to about 200 micrometers). Temperature indicator 26 contains in the range between about 95% to about 99.9% by volume of yttrium silicate and in the range between about 0.1% and about 5% by volume of terbium. Alternatively, temperature indicator 26 contains a combination of any one of a rare earth monosilicate or disilicate, and an REE that enables temperature indicator 26 to function as described herein. For example, without limitation, temperature indicator 26 includes dysprosium or europium, each of which can have different fluorescence properties. In this manner, temperature indicator 26 is tailored to emit radiation in a certain spectral range and in certain temperature environments.

In the exemplary embodiment, the layer of temperature indicator 26 is formed using slurry deposition. Alternately, temperature indicator 26 is intentionally deposited by chemical vapor deposition, plasma spray, or other conventional method. In the exemplary embodiment, the layer of temperature indicator 26 is formed over substantially all of outer layer 24 of EBC 12 of component 10. Alternatively, the layer of temperature indicator 26 is formed over only a portion of EBC 12. In the exemplary embodiment, in general, slurry deposition includes slurry formation, slurry application, and drying. It is contemplated that multiple slurry depositions are used to build up the total thickness of temperature indicator 26. Temperature indicator 26 has the thickness set forth previously with the average thickness per slurry deposition depending on the slurry solids loading, and number of dip, spray, or brush passes.

In an alternative embodiment, prior to application of the temperature indicator 26 slurry, masking is applied to outer layer 24 of EBC 12 to prevent coating certain areas of outer layer 24. Masking is carried out using conventional techniques known to those skilled in the art, including for example, without limitation, tapes, tooling, and paint-on adhesives. Subsequent to the masking of outer layer 24, the layer of temperature indicator 26 slurry is formed on outer layer 24.

In the exemplary embodiment, the temperature indicator 26 slurry is applied to outer layer 24 using any conventional slurry deposition method known to those skilled in the art, for example, without limitation, dipping, painting, rolling, stamping, spraying, or pouring the temperature indicator 26 slurry onto component 10. Slurry application automated or is carried out manually. After drying of temperature indicator 26, any masking present is then be removed by peeling off tapes and adhesives, pyrolysis of tapes and adhesives, or removing multi-use tooling. Any rough edges remaining after masking removal is scraped or cut away using a sharp or abrasive tool.

Figure 2:
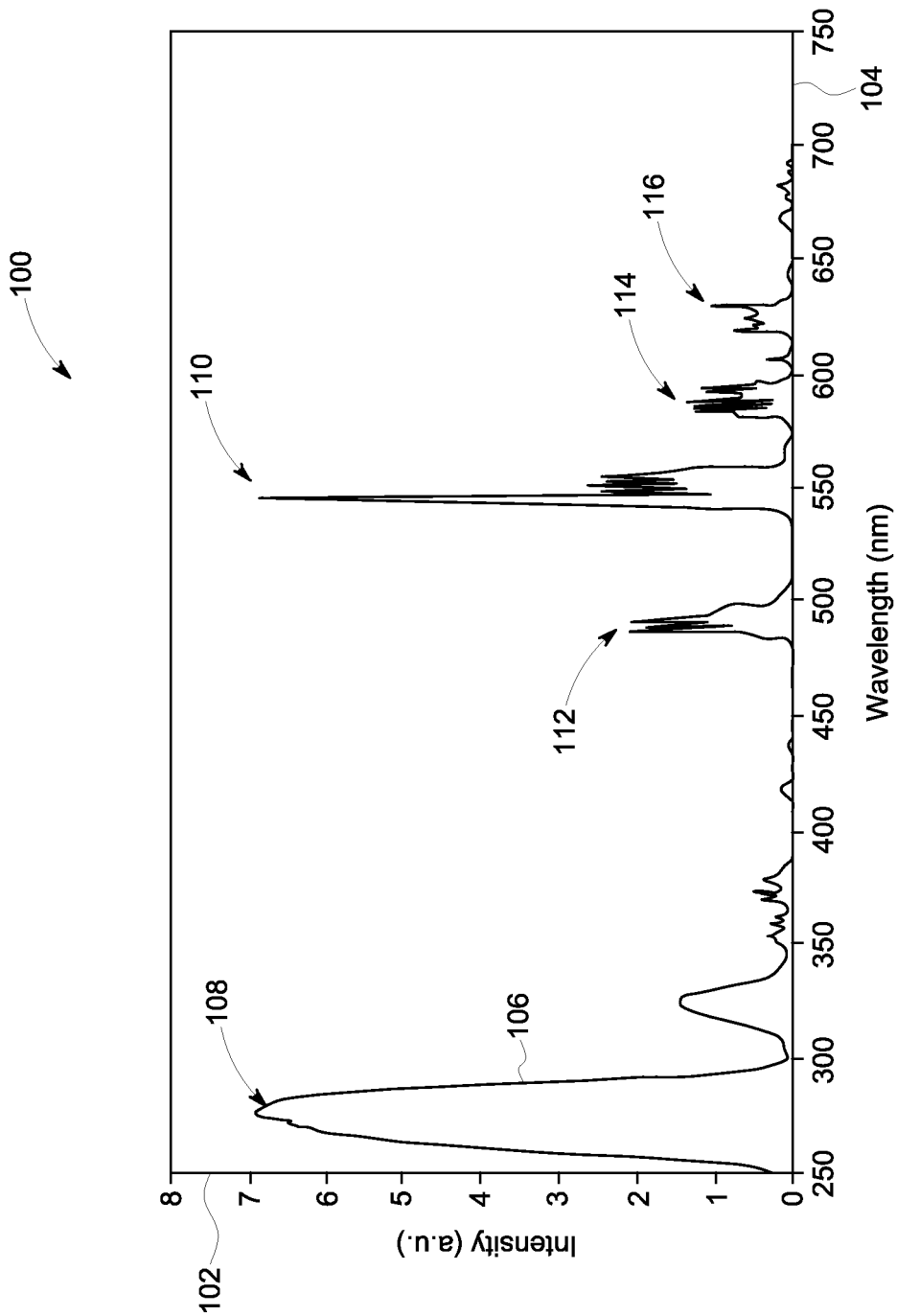
FIG. 2 is a graph generally showing the absorption and emission spectra for one embodiment of the temperature indicator shown in FIG. 1.

FIG. 2 is a graph 100 generally showing the absorption and emission spectra curve 106 for one embodiment of temperature indicator 26 (shown in FIG. 1). Y-axis 102 represents intensity in increments of 1 arbitrary unit (a.u.) extending from 0 a.u. to 8 a.u. X-axis 104 represents wavelength in increments of 50 nanometers (nm) extending from 250 nm to 750 nm. In the exemplary embodiment, temperature indicator 26 includes about 3% by volume of terbium. Doping temperature indicator 26 with rare earth materials such as terbium results in the temperature indicator 26 exhibiting fluorescent properties, and in particular, fluorescent properties that correlate to a temperature of the material. For example, without limitation, when temperature indicator 26 is exposed to photons having a specific wavelength, for example, an ultraviolet (UV) wavelength of about 275 nm, generally indicated at 108, it activates photonic properties of terbium. The resulting visible light is emitted as photons having a wavelength grouping in the range between about 540 nm to about 560 nm, generally indicated at 110. Furthermore, photons having wavelength groupings of lower intensities occur in the ranges between about 480 nm to about 510 nm, generally indicated at 112, between about 580 nm to about 600 nm, generally indicated at 114, and between about 615 nm to about 640 nm, generally indicated at 116.

Figure 3:
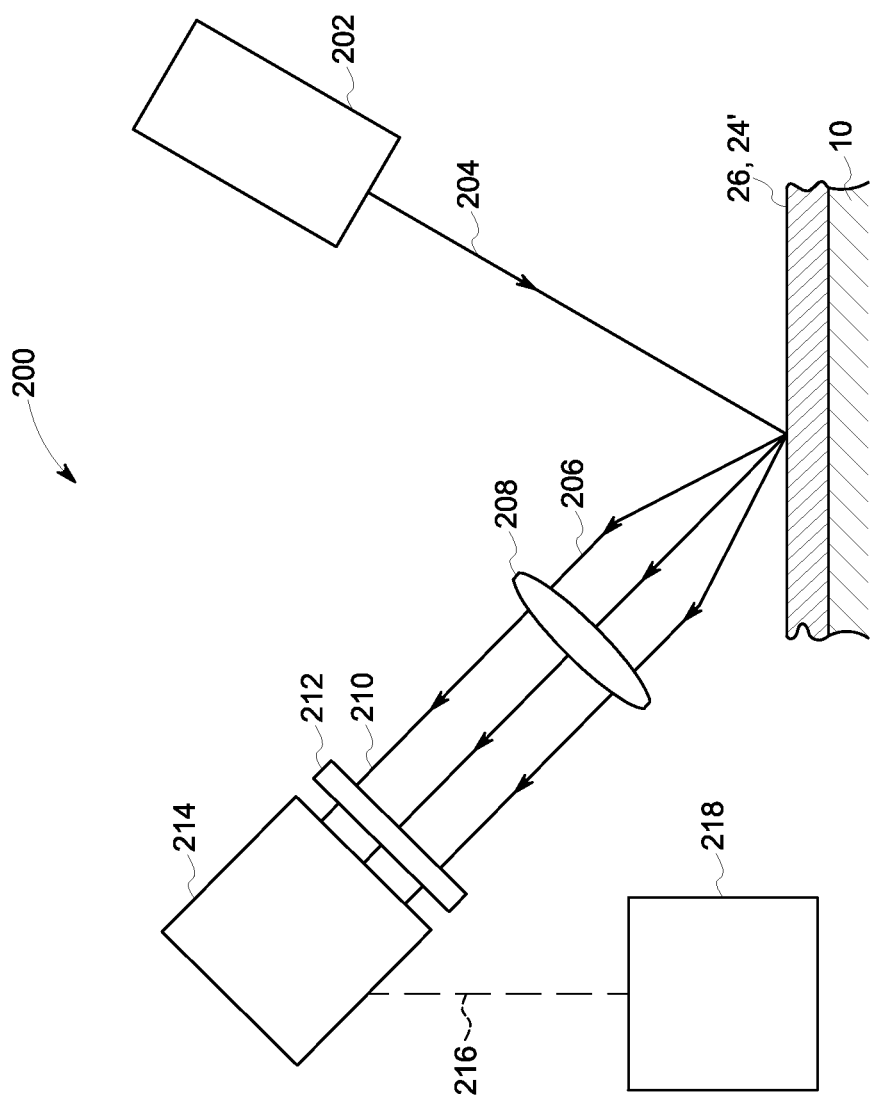
FIG. 3 is a schematic of an exemplary monitoring system for use with the component shown in FIG. 1.

FIG. 3 is a schematic of an exemplary monitoring system 200 for use with component 10. In the exemplary embodiment, monitoring system 200 includes component 10 having temperature indicator 26. A radiation source 202, for example, without limitation, a broadband light source (i.e., a light source emitting a wide band of wavelengths, such as a xenon lamp, a light emitting diode (LED), or a halogen lamp (HL)), or a single wavelength or multi-wavelength laser device, emits an excitation beam 204 that excites the materials comprising temperature indicator 26. The laser is one of a continuous-wave or a pulsed laser including, for example, without limitation, a neodymium-doped yttrium aluminum garnet (Nd:YAG) excitation laser, a xenon fluoride (XeF) excimer laser, or any other laser that enable system 200 to function as described herein. In the exemplary embodiment, excitation beam 204 is in the range between about 260 nm to about 290 nm. Alternatively, excitation beam 204 is any wavelength that enables temperature indicator 26 to function as described herein.

Further, in the exemplary embodiment, temperature indicator 26 emits a fluorescent radiation 206 in response to excitation beam 204. Fluorescent radiation 206 is in the range between about 475 nm to about 650 nm and has an intensity that correlates to the surface temperature of indicator 26. Alternatively, fluorescent radiation 206 can be any wavelength range that enables monitoring system 200 to function as described herein. In the exemplary embodiment, system 200 includes an optical focusing device 208, for example, without limitation, an optical lens, a mirror, or any combinations thereof, to generate a focused fluorescent radiation 210. A filter 212, for example, without limitation, an absorptive optical filter, an interference optical filter, a monochromator, or combinations thereof, is used to filter specific portions of the spectrum comprising focused fluorescent radiation 210. Filter 212 blocks wavelengths substantially similar to radiation source 202 from fluorescent radiation 206 and permits specific wavelengths to pass.

In the exemplary embodiment, system 200 includes an optical detector 214, for example, a photomultiplier tube (PMT), for receiving and measuring the intensity of focused fluorescent radiation 210. Alternatively, optical detector 214 is any one of several known optical detectors that enable system 200 to function as described herein. For example, without limitation, optical detector 214 can be any one of a photodiode (PD), a camera, or the like. While system 200 is described as including optical detector 214 for receiving focused fluorescent radiation 210, it should be noted that use of the term "optical" is not to be equated with the term "visible." System 200, as described herein, is configured to capture a wide spectral range. Optical detector 214 is a sensitive detector of light with wavelengths in the ultraviolet (about 200-400 nanometers (nm)), visible (about 400-700 nm), near-infrared (about 700-1200 nm), and infrared ranges (about 1200-10000 nm) of the electromagnetic spectrum. The wavelengths of photons emitted by temperature indicator 26 depend on the composition of temperature indicator 26. Accordingly, system 200 is capable of measuring many different wavelengths of light, which correlate to a temperature of component 10.

Moreover, in the exemplary embodiment, optical detector 214 is electrically coupled via electrical coupler 216 to an optical signal analyzer 218. Optical signal analyzer 218 operates at least partially as a data acquisition device and analyzes focused fluorescent radiation 210 received by optical detector 214. Optical signal analyzer 218 is a computer system that includes at least one processor (not shown) that executes operations to analyze focused fluorescent radiation 210 based at least partially on input from optical detector 214.

Figure 4:
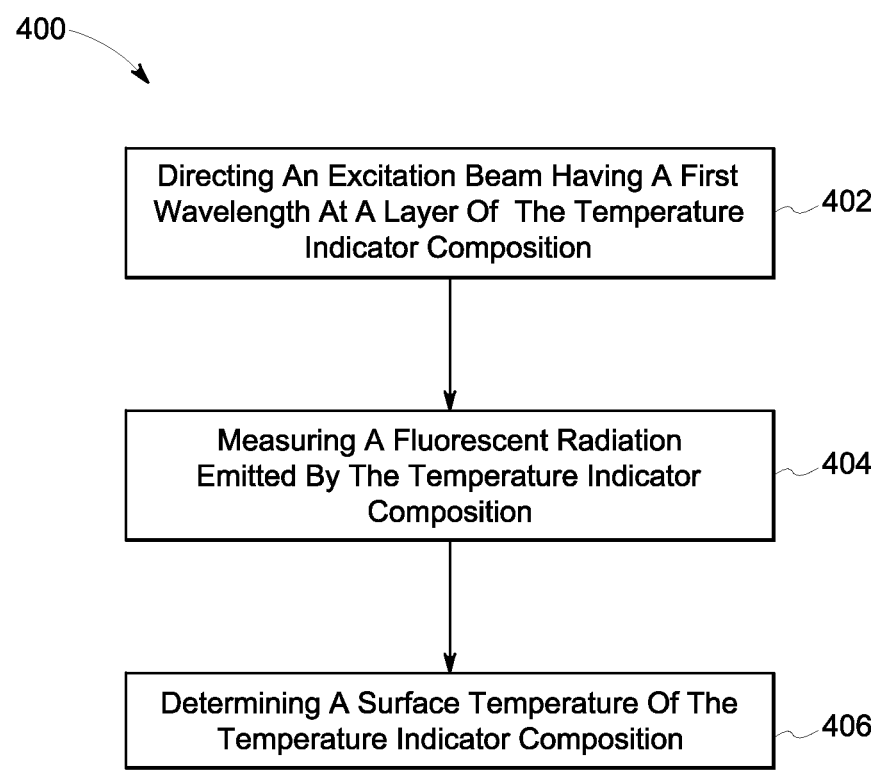
FIG. 4 is a block diagram showing an exemplary method for measuring a surface temperature of the component shown in FIG. 1 using the temperature indicator.

FIG. 4 is a block diagram showing an exemplary method 400 for measuring a surface temperature of component 10 (shown in FIG. 1) using temperature indicator 26 (shown in FIG. 1). In the exemplary method 400, temperature indicator 26 forms a layer on component 10. More specifically, temperature indicator 26 forms a layer of material that extends substantially over all of outer layer 24 of EBC 12, as component 10 is a hot gas component having EBC 12 applied for environmental protection. Radiation source 202 emits 402 excitation beam 204, which is directed at temperature indicator 26. As excitation beam 204 impacts temperature indicator 26, the REE contained in temperature indicator 26 begins to fluoresce and emits fluorescent radiation 206 in response to excitation beam 204. The wavelength and intensity of fluorescent radiation 206 is measured 404 by optical detector 214. In one embodiment, radiation source 202 emits excitation beam 204 in the UV spectrum (e.g., photons having a wavelength of about 275 nm) resulting in fluorescent radiation 206 being emitted in the visible spectrum. This is known as down-conversion fluorescence, i.e., temperature indicator 26 absorbs photons having the shorter UV wavelength and emits photons having a longer visible wavelength. Alternatively, radiation source 202 emits excitation beam 204 in the IR spectrum (e.g., a wavelength of about 950 nm) resulting in fluorescent radiation 206 being emitted in the visible spectrum. This is known as up-conversion fluorescence, i.e., temperature indicator 26 absorbs photons having the longer IR wavelength and emits photons having a shorter visible wavelength. In the exemplary embodiment, optical signal analyzer 218 determines 406 the surface temperature of component 10 based on the intensity of fluorescent radiation 206 emitted by temperature indicator 26.

Figure 5:
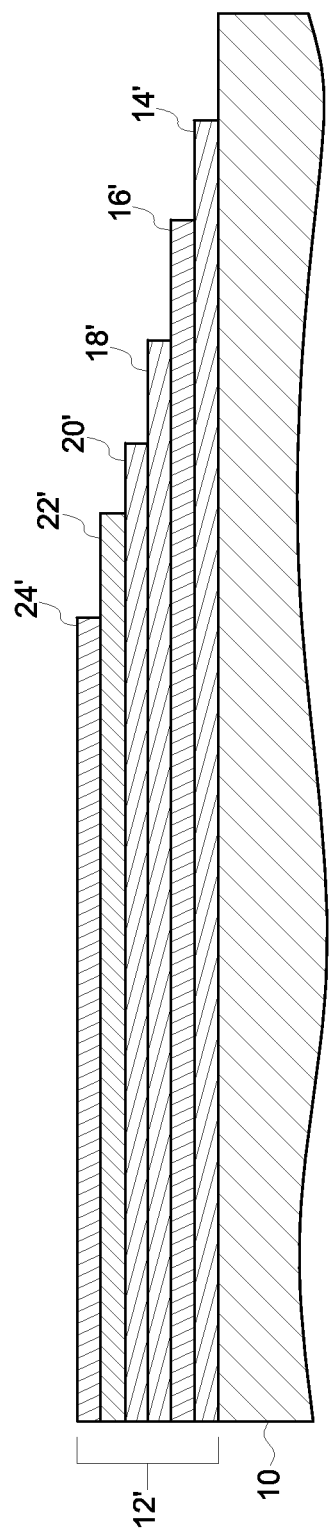
FIG. 5 is a schematic cross sectional view of an alternative embodiment of the component shown in FIG. 1 having an environmental barrier coating (EBC) doped with a temperature indicator.

FIG. 5 is a schematic cross sectional view of an alternative embodiment of component 10 (shown in FIG. 1) having an EBC 12' doped with a temperature indicator. In this embodiment, component 10 includes an EBC 12' that includes a coating system having various material layer combinations, wherein one or more of the multiple layers may be doped with a different REE. EBC 12' includes a bond coat layer 14', a silica layer 16', a transition layer 18', a compliant layer 20', an intermediate layer 22', and an outer layer 24', wherein each material layer extends substantially over all of a previous material layer. Alternatively, EBC 12' includes any combination of material layers that enable EBC 12 to function as described herein, and it is expected that some materials layers may be omitted. For example, without limitation, in one alternative embodiment, transition layer 18' is omitted.

In the exemplary embodiment, one or more of bond coat layer 14', silica layer 16', transition layer 18', compliant layer 20', intermediate layer 22', and outer layer 24' is doped with a doping composition including a REE, such as, for example, scandium, yttrium, lanthanum, cerium, praseodymium, neodymium, promethium, samarium, europium, gadolinium, terbium, dysprosium, holmium, erbium, thulium, ytterbium, lutetium, and mixtures thereof. As described above, REEs have a special electron structure that enables them to have special properties of fluorescence when excited (provided with energy), wherein each element emits photons in a different fluorescent spectral range. In one embodiment, each material layer of EBC 12' is doped with a different REE doping composition. In another embodiment, only outer layer 24' is doped with an REE, for example, terbium.

EBCs play an important role in the successful operation of component 10. The qualification of such coatings requires extensive testing. In general, EBC materials have a contaminant threshold, wherein a level of material contamination below such threshold is acceptable. It is desirable, therefore, to use an EBC material with REE dopant levels below a contaminant threshold of the EBC material. Such low levels of dopant should facilitate reducing the effect of the dopant on the EBC and facilitate reducing, or eliminating, testing required to qualify the material for use with the EBC. Accordingly, in the exemplary embodiment, one or more of bond coat layer 14', silica layer 16', transition layer 18', compliant layer 20', intermediate layer 22', and outer layer 24' contains an REE dopant in the range between about 0.1% and about 1.0% by volume, which facilitates reducing the effect the REE has on EBC 12' properties.

Figure 6:
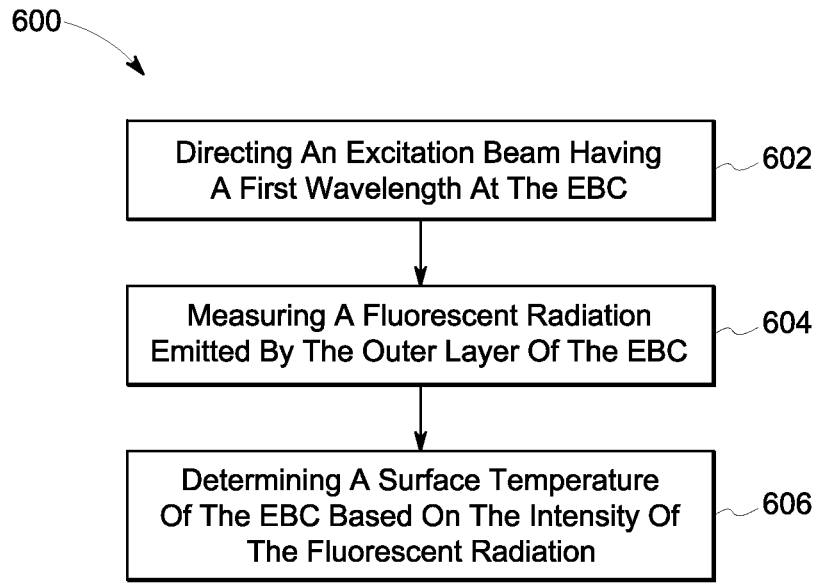
FIG. 6 is a block diagram showing an alternative method for measuring a surface temperature of the component shown in FIG. 5 using the monitoring system shown in FIG. 3.

FIG. 6 is a block diagram showing an alternative method 600 for measuring a surface temperature of component 10 (shown in FIG. 5) using monitoring system 200 (shown in FIG. 3). In method 600, EBC 12' forms a layer on component 10. EBC 12' includes one or more layers of material, including outer layer 24'. Furthermore, outer layer 24' includes an REE dopant. Radiation source 202 emits 602 excitation beam 204 toward EBC 12'. As excitation beam 204 impacts outer layer 24' of EBC 12', the REE contained in outer layer 24' begins to fluoresce and emits fluorescent radiation 206 in response to excitation beam 204. The wavelength and intensity of fluorescent radiation 206 is measured 604 by optical detector 214. In one embodiment, radiation source 202 emits excitation beam 204 in the UV spectrum (e.g., a wavelength of about 275 nm) resulting in fluorescent radiation 206 being emitted in the visible spectrum. This is known as down-conversion fluorescence, i.e., outer layer 24' of EBC 12' absorbs photons having the shorter UV wavelength and emits photons having a longer wavelength. Alternatively, radiation source 202 emits excitation beam 204 in the IR spectrum (e.g., a wavelength of about 950 nm) resulting in fluorescent radiation 206 being emitted in the visible spectrum. This is known as up-conversion fluorescence, i.e., outer layer 24' of EBC 12' absorbs photons having the longer IR wavelength and emits photons having a shorter wavelength. In the exemplary embodiment, optical signal analyzer 218 determines 606 the surface temperature of component 10 based on the intensity of fluorescent radiation 206 emitted by outer layer 24' of EBC 12'.

Figure 7:
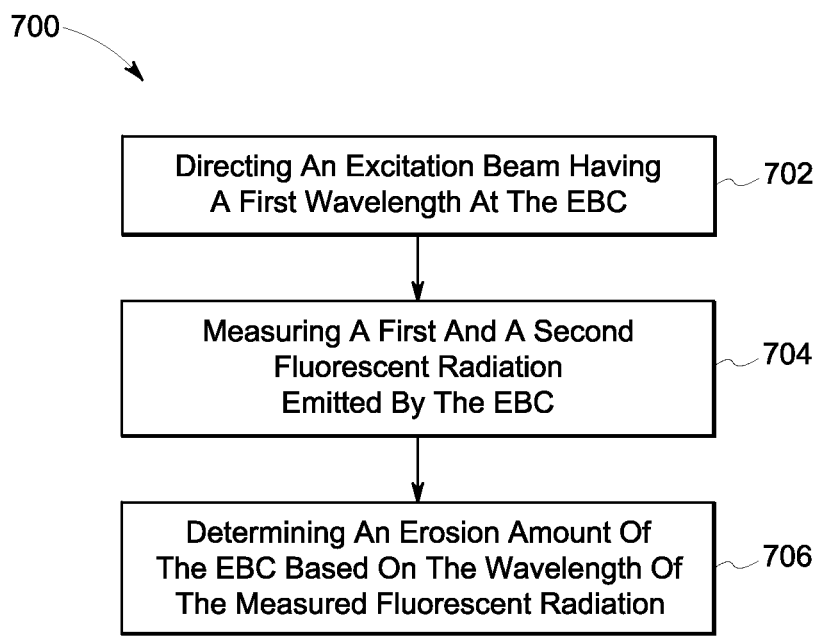
FIG. 7 is a block diagram showing an exemplary method for determining erosion of the EBC of the component shown in FIG. 5 using the monitoring system shown in FIG. 3.

FIG. 7 is a block diagram showing an exemplary method 700 for determining erosion of EBC 12' of component 10 (shown in FIG. 5) using monitoring system 200 (shown in FIG. 3). In the exemplary method, EBC 12' forms a layer on component 10. EBC 12' includes at least two layers of material, including bond coat layer 14' and outer layer 24'. Furthermore, each of bond coat layer 14' and outer layer 24' includes a different REE dopant, where each REE dopant has a different spectral emission property. Alternatively, EBC 12' contains more than two materials layers, wherein each discrete material layer includes an REE dopant that has a different spectral emission property. In the exemplary embodiment, radiation source 202 emits 702 excitation beam 204 toward EBC 12'. As excitation beam 204 impacts one or more of the material layers, including one of outer layer 24' and bond coat layer 14' of EBC 12', the REE contained in bond coat layer 14' or outer layer 24' begins to fluoresce and emits photons having fluorescent radiation 206 in response to excitation beam 204. Fluorescent radiation 206 has different wavelengths associated with it based on the layer of EBC 12' that is emitting the radiation. The different wavelengths of fluorescent radiation 206 are measured 704 by optical detector 214. In one embodiment, radiation source 202 emits excitation beam 204 in the UV spectrum (e.g., a wavelength of about 275 nm) resulting in fluorescent radiation 206 being emitted in the visible spectrum. This is known as down-conversion fluorescence, i.e., EBC 12' absorbs photons having the shorter UV wavelength and emits photons having a longer wavelength. Alternatively, radiation source 202 emits excitation beam 204 in the IR spectrum (e.g., a wavelength of about 950 nm) resulting in fluorescent radiation 206 in the visible spectrum. This is known as up-conversion fluorescence, i.e., EBC 12' absorbs photons having the longer IR wavelength and emits photons having a shorter wavelength. In the exemplary embodiment, optical signal analyzer 218 determines 706 an erosion amount of EBC 12' of component 10 based on the specific wavelengths of fluorescent radiation 206 detected by optical detector 214.

The methods, apparatus, and systems described herein facilitate measuring a surface temperature of a CMC component using an existing composition of an EBC material. Specifically, the methods, apparatus, and systems described herein facilitate using a radiation source to cause an indicator material on or within the EBC to fluoresce, where the intensity of the fluorescent emission is based on a surface temperature of the EBC. Further, the methods, apparatus, and systems described herein facilitate monitoring the life of the EBC coating by including a different indicator material in each layer of the EBC, wherein each indicator material fluoresces in a different spectral range. Therefore, measuring the specific spectral emission give an indication of the amount of erosion of the EBC and an expected life.

An exemplary technical effect of the methods, systems, and apparatus described herein includes at least one of: (a) providing accurate surface temperature measurements for an EBC coating; (b) using the existing EBC composition without adding other materials; (c) facilitating online or real-time EBC health monitoring and prognosis; and (d) facilitating EBC repair monitoring and quality control.

Exemplary embodiments of a method for measuring a surface temperature of an EBC coated component and a system for use therein are described above in detail. The methods, systems, and apparatus are not limited to the specific embodiments described herein, but rather, components of the systems and apparatus, and/or steps of the methods may be utilized independently and separately from other components and/or steps described herein. For example, the sensor material and methods may also be used in combination with other components and methods, and are not limited to practice with only the gas turbine engines and systems as described herein. Rather, the exemplary embodiment can be implemented and utilized in connection with many other high temperature applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of monitoring at least one of a temperature and erosion of an environmental barrier coating (EBC) of a hot gas component, said method comprising:
   directing an excitation beam having an excitation wavelength at the EBC deposited on an outer surface of the hot gas component, the EBC including at least a bond coat layer and an outer layer, the hot gas component being fabricated from a ceramic matrix composite (CMC);
   measuring a first fluorescent radiation emitted by the bond coat layer and a second fluorescent radiation emitted by the outer layer of the EBC, wherein the first fluorescent radiation includes a first wavelength and a first intensity, and the second fluorescent radiation
   includes a second wavelength and a second intensity, the second wavelength different from the first wavelength; and
   determining at least one of a surface temperature and an erosion amount of the EBC based on at least one of the wavelength and intensity of the measured first and second fluorescent radiations.

2. The method in accordance with claim 1 further comprising producing at a point of impact of the excitation beam at least one of a frequency up-conversion first fluorescent radiation and a frequency up-conversion second fluorescent radiation.

3. The method in accordance with claim 2, wherein the excitation beam has the excitation wavelength in the range between about 700 nanometers and about 1200 nanometers.

4. The method in accordance with claim 1 further comprising producing at a point of impact of the excitation beam at least one of a frequency down-conversion first fluorescent radiation and a frequency down-conversion second fluorescent radiation.

5. The method in accordance with claim 4, wherein the excitation beam has the excitation wavelength in the range between about 200 nanometers and about 400 nanometers.

6. The method in accordance with claim 1, wherein directing an excitation beam comprises directing the excitation beam having an excitation wavelength at the EBC deposited on the outer surface of the hot gas component, the EBC including at least a bond coat layer and an outer layer, the hot gas component being fabricated from a ceramic matrix composite (CMC), the bond coat layer including at least one of a silicon metal and a silicide, and at least one first rare earth element (REE).

7. The method in accordance with claim 6, wherein the outer layer includes at least one of a rare earth mono silicate and a rare earth di silicate, and at least one second REE, wherein the at least one second REE is different from the at least one first REE.

8. The method in accordance with claim 7, wherein the first and second REE is selected from the group consisting of scandium, yttrium, lanthanum, cerium, praseodymium, neodymium, promethium, samarium, europium, gadolinium, terbium, dysprosium, holmium, erbium, thulium, ytterbium, and lutetium.

9. The method in accordance with claim 1, wherein directing an excitation beam comprises directing the excitation beam using a pulsed laser device including at least one of a pulsed neodymium-doped yttrium aluminum garnet (Nd:YAG) excitation laser and pulsed a xenon fluoride (XeF) excimer laser.

* * * * *